United States Patent
Berns

(10) Patent No.: US 7,513,181 B2
(45) Date of Patent: Apr. 7, 2009

(54) AIR OPERATED UNLOADING DEVICE

(75) Inventor: Joseph P. Berns, Mason, OH (US)

(73) Assignee: J.F. Berns Co., Inc., Cincinnati, OH (US)

( * ) Notice: Subject to any disclaimer, the term of this patent is extended or adjusted under 35 U.S.C. 154(b) by 886 days.

(21) Appl. No.: 10/966,377

(22) Filed: Oct. 15, 2004

(65) Prior Publication Data

US 2005/0111957 A1  May 26, 2005

Related U.S. Application Data

(60) Provisional application No. 60/524,527, filed on Nov. 24, 2003.

(51) Int. Cl.
  *B23B 13/10*   (2006.01)
  *B23B 15/00*   (2006.01)
(52) U.S. Cl. ............................. 82/124; 82/126; 82/127; 414/745.1
(58) Field of Classification Search ........... 82/124–127; 414/745.1, 17
See application file for complete search history.

(56) References Cited

U.S. PATENT DOCUMENTS

| | | | | |
|---|---|---|---|---|
| 2,327,916 A | * | 8/1943 | Mariotte | 414/17 |
| 3,038,636 A | | 6/1962 | Hamilton | 221/234 |
| 3,215,287 A | | 11/1965 | Bodan | 414/18 |
| 3,390,315 A | * | 6/1968 | McDonough et al. | 318/571 |
| 3,689,010 A | | 9/1972 | Alexandrov et al. | 406/110 |
| 3,706,428 A | | 12/1972 | Carlier | 406/110 |
| 3,823,628 A | | 7/1974 | Fortune | 82/2.7 |
| 3,945,275 A | | 3/1976 | Ovanin | 82/40 |
| 4,090,423 A | | 5/1978 | Waage | 82/127 |
| 4,129,220 A | | 12/1978 | Peterson et al. | 414/18 |
| 4,254,676 A | | 3/1981 | Wilson | 82/37 |
| 4,406,190 A | | 9/1983 | Mason | 414/17 |
| 4,423,993 A | * | 1/1984 | Eaton | 414/17 |
| 4,536,000 A | | 8/1985 | Röhm | 279/1 |
| 4,645,220 A | | 2/1987 | Hiestand | 279/111 |
| 4,794,813 A | | 1/1989 | Brown et al. | 82/124 |
| 4,909,521 A | | 3/1990 | Ovanin | 279/1 |
| 4,932,674 A | | 6/1990 | Pesch et al. | 279/4 |

(Continued)

FOREIGN PATENT DOCUMENTS

DE  672422  3/1939

(Continued)

*Primary Examiner*—Willmon Fridie
(74) *Attorney, Agent, or Firm*—Wood, Herron & Evans, L.L.P.

(57) ABSTRACT

A device for effecting an unloading operation of a workpiece with respect to a machine tool. The device includes a non-rotating dump tube having one end adapted for communication with a machine tool and a sidewall defining an opening for discharging a workpiece, a vacuum chamber enclosing the opening in the sidewall and including a workpiece outlet, the chamber configured to receive a workpiece from the dump tube, a door selectively sealingly engaged with the workpiece outlet, and configured to allow the unloading of a workpiece, and a source of vacuum coupled to the vacuum chamber and configured to draw a workpiece through the dump tube and into the vacuum chamber for unloading. A coupling may be disposed between an unloading device and a machine tool to allow the machine tool to operate at increased rates during an unloading operation.

25 Claims, 4 Drawing Sheets

U.S. PATENT DOCUMENTS

| | | | | |
|---|---|---|---|---|
| 5,343,788 A | | 9/1994 | Goforth | 414/17 |
| 5,347,896 A | | 9/1994 | Jones | 82/124 |
| 5,505,584 A | * | 4/1996 | Berns | 414/745.1 |
| 5,541,588 A | | 7/1996 | Matsuhashi et al. | 340/870.01 |
| 5,676,031 A | | 10/1997 | Manning | 82/153 |
| 5,715,735 A | * | 2/1998 | Alden et al. | 82/124 |
| 5,777,562 A | | 7/1998 | Hoffman | 340/870.07 |

FOREIGN PATENT DOCUMENTS

| | | |
|---|---|---|
| GB | 917158 | 1/1963 |

* cited by examiner

AIR OPERATED UNLOADING DEVICE

This application claims the benefit of U.S. Provisional Application Ser. No. 60/524,527 filed on Nov. 24, 2003, the disclosure of which is hereby fully incorporated by reference herein.

FIELD OF THE INVENTION

The present invention generally relates to unloading apparatuses for machine tools, such as lathes. More specifically, the invention relates to air operated unloading devices and the operation of such devices in permitting automatic unloading of workpieces.

BACKGROUND OF THE INVENTION

Various types of feed mechanisms exist in the machine tool industry to automate the loading and/or unloading of workpieces into and out of a machine tool. In this regard, it is desirable with respect to both production speed and safety to automatically place workpieces into the machine tool prior to a machine operation and then to automatically remove the workpieces from the machine tool when the machining operation or operations are complete. The intervention of machine tool operators during the process slows the production time and presents additional dangers to the operator.

Many automated loading and unloading devices are too complex and expensive to justify their use in any but the most elaborate and expensive machine tools. Such loading and unloading mechanisms may include, for example, robotic devices or other programmable or otherwise electrically controlled arms, indexing devices, etc. While needs exist in the industry for these sophisticated and expensive machine tool loading and unloading mechanisms, especially in connection with many high volume machining operations, these solutions to the problems associated with manual loading and unloading operations can be too expensive.

One air operated loading and unloading device that solves many of the problems typical of manual loading and unloading operations is disclosed in U.S. Pat. No. 5,505,584 (the '584 patent), assigned to the assignee of the present invention and the disclosure of which is hereby incorporated herein by reference. Using this device, a workpiece may be unloaded and/or loaded via a concentric tubular arrangement. The tubes rotate with respect to each other using a mechanism to facilitate either an unloading operation or a loading and unloading operation with respect to a machine tool spindle. Improvements related to simplifying the rotating mechanism are desirable.

Another air operated loading and unloading device that solves many of the problems typical of manual loading and unloading operations is U.S. Pat. No. 6,202,523 (the '523 patent), assigned to the assignee of the present invention and the disclosure of which is hereby incorporated herein by reference. This device includes a base adapted to be mounted adjacent the machine tool and a tubular member mounted for rotation with respect to the base. The tubular member includes an inner chamber and an elongated opening communicating with the inner chamber for receiving the workpiece. The inner chamber includes one end adapted to communicate with a spindle of the machine tool. A sealing member is mounted for selective removal from the tubular member and for selective, sealing engagement around the elongated opening. As the sealing member is removed from the tubular member, the tubular member may be rotated using a mechanism to unload the workpiece. Again, improvements related to simplifying the rotating mechanism would be desirable.

Further, machine tools generally must cease operation or stop, or slow significantly, so that an automated unloading device may operate to permit automatic unloading of a workpiece. Such stopping or significant slowing is generally necessary to prevent or limit the relative rotation of various pieces of the machine tool and the unloading device, thereby avoiding or reducing the generation of heat, wear, etc. in and on the various pieces.

The necessity of stopping or slowing a machine tool has a number of drawbacks. First, unloading times are, in part, based on the time necessary for the machine tool to stop or slow, and waiting for a machine tool to stop or slow generally increases unloading times. Second, constantly stopping or slowing the machine tool increases wear on the motor of the machine tool, thereby reducing motor life, and, third, stopping or slowing the machine tool generally increases the amount of electric power the motor consumes.

For example, the spindle of a lathe may rotate at rates up to, and including, the maximum operating speed of the lathe during machining operations. However, the spindle of a lathe may rotate at reduced rates of below about 75 revolutions per minute (RPM) during an unloading operation, depending on such factors as workpiece material, chuck mating chamfers, etc. Such a reduced rotation rate aids in breaking a workpiece free of the chuck of the lathe, while heat, wear, etc. in and on the various pieces is reduced to an acceptable level.

Improvements related to increasing the rotation rate of a machine tool during the automatic unloading of a workpiece are desirable.

Improvements related to the machine tool industry, and more specifically related to air operated loading and unloading devices therefore continue to be necessary.

SUMMARY OF THE INVENTION

Generally, the present invention provides a device for effecting an unloading operation of a workpiece with respect to a machine tool. The device includes a non-rotating dump tube having one end adapted for communication with a machine tool and a sidewall defining an opening for discharging a workpiece, a vacuum chamber enclosing the opening in the sidewall and including a workpiece outlet, the chamber configured to receive a workpiece from the dump tube, a door selectively sealingly engaged with the workpiece outlet, and configured to allow the unloading of a workpiece, and a source of vacuum coupled to the vacuum chamber and configured to draw a work piece through the dump tube and into the vacuum chamber for unloading. An actuator may be included to operatively engaged and open the door to unload a workpiece. An impact absorber may also be included to absorb the impact of a workpiece as it is drawn into the dump tube. The impact absorber may also aid in locating a workpiece proximate the opening in the sidewall so that the workpiece may be readily discharged. Such an unloading device need not rotate the dump tube to effectuate unloading a workpiece, and, thereby, simplifies or eliminates the need for a rotating mechanism.

The invention further contemplates a coupling between the unloading device and a machine tool. Such a coupling allows the machine tool to continue to operate or rotate at increased rates during an unloading operation. Allowing a machine tool to continue to rotate at increased rates while unloading workpieces reduces unloading times. Further, allowing a machine tool to continue to rotate at increased rates while unloading workpieces decreases wear on a machine tool motor, increases the motor life, and, generally, decreases the amount of electric power the motor consumes.

Various additional objectives, advantages, and features of the invention will become more readily apparent to those of ordinary skill in the art upon review of the following detailed description of the preferred embodiments taken in conjunction with the accompanying drawings.

DETAILED DESCRIPTION OF THE PREFERRED EMBODIMENTS

Figure 1:
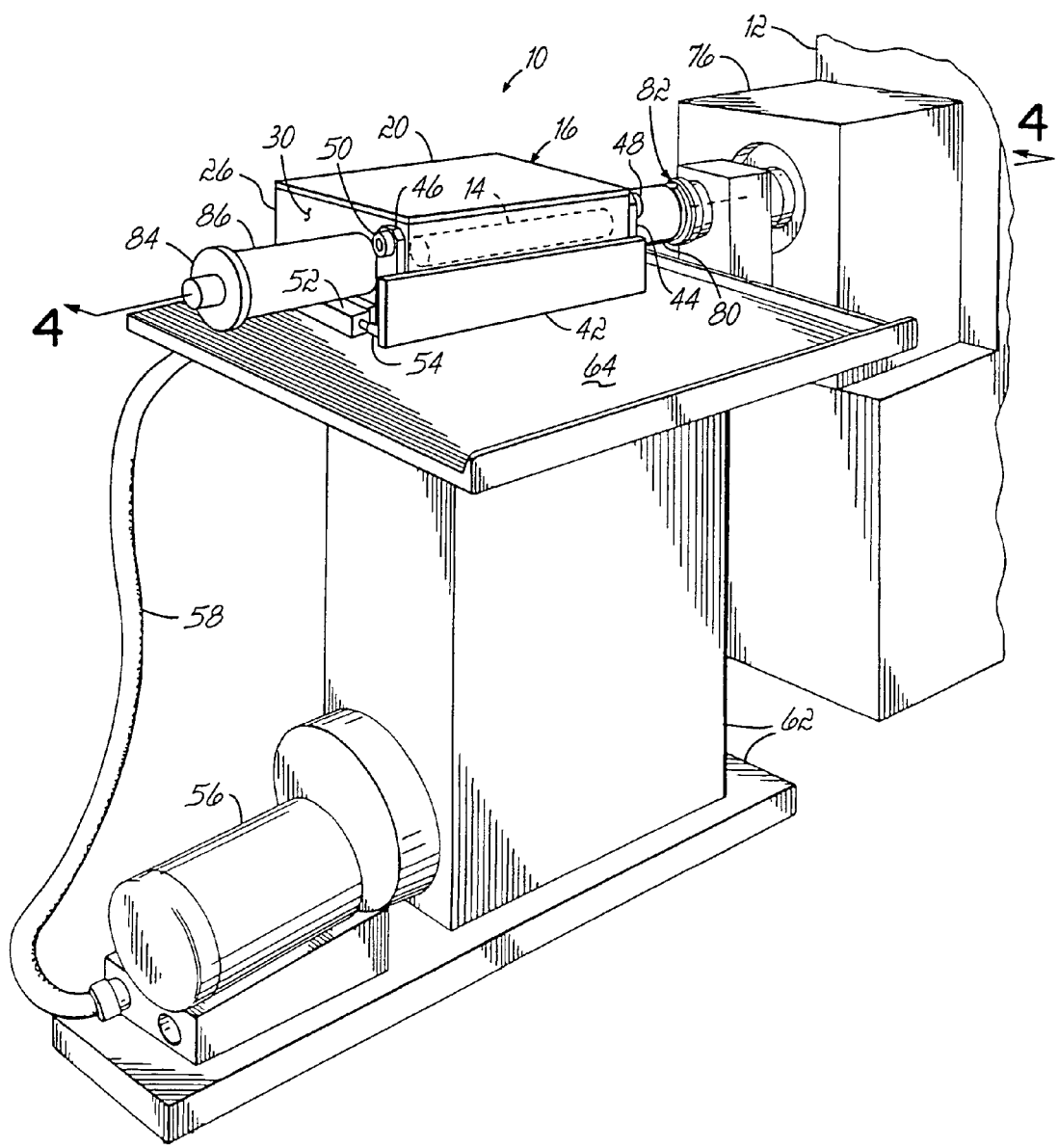
FIG. 1 is a perspective view of an air operated unloading device adjacent a lathe and constructed in accordance with a preferred embodiment of the invention.
Figure 2:
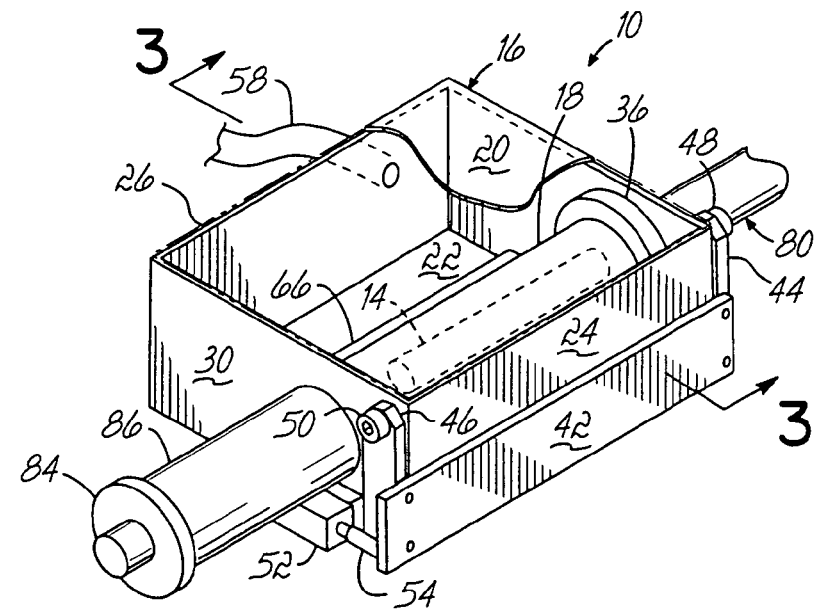
FIG. 2 is an enlarged perspective view showing the automated unloading device of FIG. 1.
Figure 3:
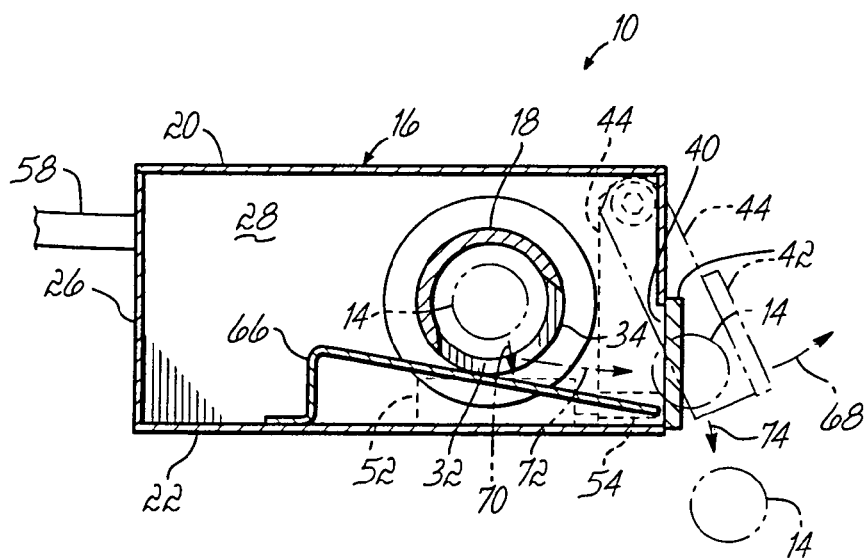
FIG. 3 is a cross sectional view taken along line 3-3 of FIG. 2 schematically illustrating the unloading of a workpiece.

Referring to FIGS. 1-4, an unloading device 10 constructed in accordance with a first embodiment of the invention is shown coupled to a lathe 12. Device 10 is used only as an unloading device and operates to retrieve workpieces 14 from lathe 12 into a non-rotating dump tube 18 associated with a vacuum chamber 16. Dump tube 18 has one end adapted for communication with lathe 12 and a sidewall 34 defining an opening 32 for discharging a workpiece 14. As shown in FIG. 3, opening 34 is generally oriented in a downward direction so that gravity may have a beneficial effect in discharging workpiece 14 form dump tube 18.

Vacuum chamber 16 encloses opening 32 in sidewall 34 of dump tube 18 and includes a workpiece outlet 40. Vacuum chamber 16 is configured to receive workpiece 14 discharged from dump tube 18. More particularly, and in this embodiment, vacuum chamber 16 is generally shaped as a rectangular box having a top 20, a bottom 22, a front wall 24, a back wall 26, and sidewalls 28, 30. In other embodiments of the present invention, a vacuum chamber may have a different shape.

As configured in device 10, dump tube 18 passes through sidewalls 28, 30 of chamber 16, and is mounted in a fixed or non-rotatable position with respect to vacuum chamber 16 using collars 36, 38. Collars 36, 38 may also function to seal the junctions of dump tube 18 and sidewalls 28, 30 as the dump tube passes through the sidewalls.

Formed in front wall 24 of chamber 16 is workpiece outlet 40 for unloading workpieces 14. In other embodiments of the present invention, a workpiece outlet may be formed in another surface of a vacuum chamber. For example, workpiece outlet 40 could be form in bottom 16 or back 26 of chamber 16 without departing from the spirit of the present invention.

A door 42 selectively sealingly engages workpiece outlet 40. To this end, door 42 is coupled to hinge arms 44, 46. Hinge arms 44, 46 pivot on shoulder screws 48, 50, respectively, that couple the hinge arms to sidewalls 28, 30, allowing door 42 to open and close.

Door 42 may be opened using actuator 52. Actuator 52 may be a pneumatic or electric type that advances a push rod 54 to push door 42 open. In some embodiments of the present invention, and as shown in FIGS. 1-4, push rod 54 may simply push against door 42 to force door 42 open, gravity closing door 42 when the push rod is retracted. However, in other embodiments of the present invention, push rod 54 may be coupled to door 42 such that when push rod 54 is retracted, door 42 is pulled closed. Such might be the case where, for example, a workpiece outlet is located on the bottom of a vacuum chamber.

A source of vacuum, such as an air pump 56, is coupled via a hose 58 to an aperture 60 in back wall 26 of chamber 16. This hose may supply negative air pressure to dump tube 18 as generally discussed in the above incorporated '584 and '523 patents.

The various components of device 10 are preferably mounted to a base 62 having a tray 64 such that dump tube 18 is disposed in line with a spindle liner 78 of lathe 12. Spindle liner 78 will be discussed in more detail below.

In operation, door 42, when closed, channels a vacuum through dump tube 18, as provided by, for example, air pump 56 coupled to vacuum chamber 16, drawing workpiece 14 through dump tube 18 and into vacuum chamber 16 for unloading. When door 42 is opened, the vacuum draw on workpiece 14 is released and workpiece 14 is unloaded through workpiece outlet 40 in vacuum chamber 16.

Figures 4, 5:
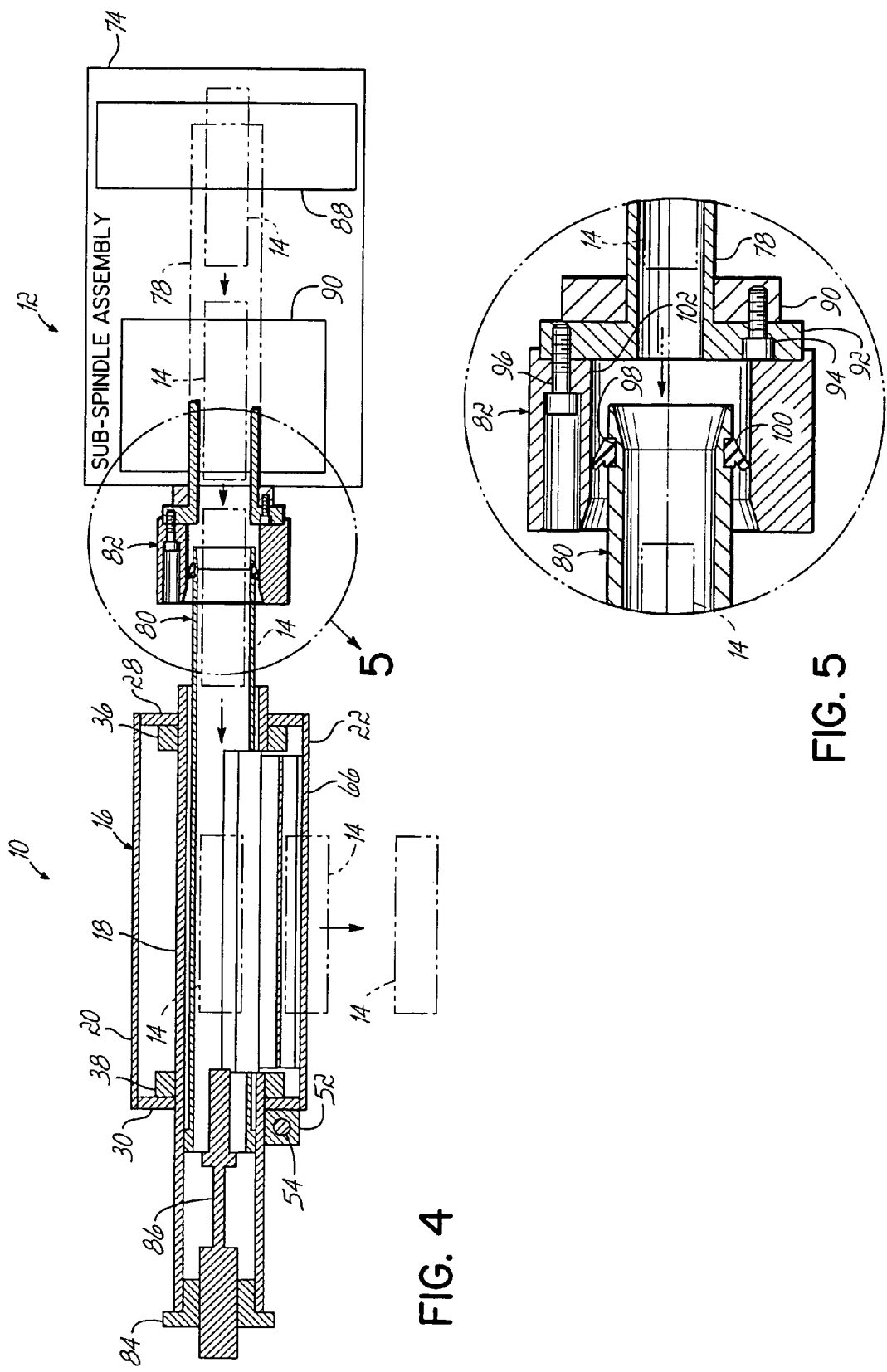
FIG. 4 is a cross sectional view taken along line 4-4 of FIG. 1 showing a workpiece being drawn from the lathe using the unloading device.
FIG. 5 is a detailed view taken about circle 5 in FIG. 4, and showing the coupling of FIG. 4 including a seal.

As shown in FIGS. 1, 2, and 4, the end of dump tube 18 adapted for communication with lathe 12 may also be configured to receive a vacuum liner 80 through which workpieces 14 are also drawn. Generally it is desirable to have the inner diameter of the dump tube somewhat or slightly larger than the outer diameter of a workpiece 14, thereby minimizing or reducing the amount of vacuum necessary for unloading a workpiece 14. However, it may also be desirable to unload workpieces having various outer diameters. Thus, the selection and insertion of various vacuum liners having differing inner diameters, effectively adapts or changes the inner diameter of a dump tube, and allows the unloading of workpieces having various outer diameters without having to inordinately increase the amount of vacuum.

Adjacent the other, or distal, end of dump tube 18 is an end cap 84. Integrated into end cap 84 is an impact absorber 86. Impact absorber 86 functions to absorb the impact of workpieces 14 as the workpieces are drawn into dump tube 18. Impact absorber 86 may also function to locate workpieces 14 proximate opening 32 in the sidewall 34 of dump tube 18 so that the workpieces may be readily discharged.

Now referring more specifically to FIG. 2, an enlarged perspective view of unloading device 10 shown in FIG. 1 is illustrated. As illustrated in FIG. 2, a portion of top 20 is broken-away so that the inside of vacuum chamber 16 is visible. With top 20 partially broken-away, dump tube 18 and collar 36 are clearly visible, as well as aperture 60 in back wall 26 to which hose 58 connects. A portion of a discharge ramp 66 located below dump tube 18 is also visible.

Referring now to FIG. 3, a cross sectional view taken along line 3-3 of FIG. 2 schematically illustrating the discharge and unloading of a workpiece 14 from dump tube 18 and vacuum chamber 16, respectively. To discharge a workpiece 14 from dump tube 18, door 42 is closed against front wall 24, such that a sufficient seal is formed to allow workpiece 14 to be drawn from lathe 12 (shown in FIG. 1) through vacuum liner 80 and dump tube 18 into vacuum chamber 16 by pump 56.

Once workpiece 14 is drawn into vacuum chamber 16, actuator 52 may be activated to extend push rod 54, forcing door 42 open, as indicated by arrow 68. This allows workpiece 14 to discharge through opening 32 in sidewall 34 of dump tube 18, and onto discharge ramp 66, as indicated by arrow 70. Workpiece 14 then rolls down discharge ramp 66, as indicated by arrow 72, unloading through workpiece outlet 40 in front wall 24 of vacuum chamber 16. Workpiece 14 drops into tray 64, as indicated by arrow 74, and shown in FIG. 1. Thus, workpiece 14 gravity feeds to workpiece outlet 40 in front wall 24 of vacuum chamber 16. Actuator 52 may then be deactivated to allow door 42 to close against front wall 24 of vacuum chamber 16, sealing workpiece outlet 40, after which the next workpiece may be withdrawn through dump tube 18 under vacuum.

Referring now to FIG. 4, a cross sectional view taken along line 4-4 of FIG. 1 showing workpiece 14 being drawn from lathe 12 using unloading device 10. As shown in block diagram form, lathe 12 generally includes a sub-spindle assembly 76 into which the spindle liner 78 is inserted. Sub-spindle assembly 76 further includes a chuck 88 for grasping workpieces 14 and a bearing assembly 90 (a portion of which is shown in cross section) that allows sub-spindle assembly 76 to rotate in response to a motor (not shown). More specifically, and as shown in FIG. 4, spindle liner 78 is insert through bearing assembly 90, and extends into chuck 88. In use, spindle liner 78, like sub-spindle assembly 76, rotates.

Spindle liners are generally available having a variety of inner diameters. Spindle liner 78, like vacuum liner 80, is selected such that the inner diameter is slightly larger than the outer diameter of workpieces 14, thereby providing adequate vacuum draw on workpieces 14 using pump 56. Again, vacuum liner 80 is inserted into dump tube 18, the inner diameter of vacuum liner 80 also being slightly larger than the outer diameter of workpieces 14, and, likewise, providing adequate vacuum draw on workpieces 14 using pump 56.

In some embodiments, sub-spindle assembly 76 may be made to move backwards, such that spindle liner 78 contacts vacuum liner 80, thereby providing adequate vacuum draw on workpieces 14. In other embodiments, vacuum liner 80 may be made to move forward, such that vacuum liner 80 contacts spindle liner 78, again, providing adequate vacuum draw on workpieces 14. In either instance, lathe 12 must be stopped, or slowed down significantly, e.g., 30-75 revolutions per minute (RPM), such that spindle liner 78 and vacuum liner 80 do not rotated in contact with respect to each other, or rotate with respect to each other at a much reduced rate, thereby avoiding or reducing the generation of heat, wear, etc. in and on one or both of the liners 78, 80.

The present invention eliminates the necessity of stopping or significantly slowing lathe 12 by providing a coupling 82 between a spindle liner 78 and vacuum liner 80. Coupling 82 allows spindle liner 78 and vacuum liner 80 to rotate with respect to each other, while providing adequate vacuum draw on workpieces 14. Thus, spindle liner 78 and an associated motor need not stop or slow significantly. Workpiece unloading may take place while a lathe is operating at increased rotating rates faster than inching, or 100 RPM, up to the maximum speed of the lathe or, for example, at least 4,000 RPM.

Allowing a spindle liner and an associated motor to continue to rotate at increased rates while unloading workpieces reduces unloading times. Further, allowing a spindle liner and an motor to continue to rotate at increased rates decreases wear on the motor, increases motor life, and, generally, decreases the amount of electric power the motor consumes.

Referring now to FIG. 5, a detailed view taken about circle 5 in FIG. 4, and showing coupling 82 of FIG. 4 is illustrated. As detailed in FIG. 5, spindle liner 78 includes a flange 92 that allows spindle liner 78 to be bolted to bearing assembly 90 using bolts 94. In a similar manner, coupling 82 is bolted to flange 92 of spindle liner 78 using bolts 96. Formed in vacuum liner 80 is a groove 98.

Coupling 82 includes seal 100 that is inserted into groove 98 of vacuum liner 80, and that rides against inner wall 102 of coupling 82. Thus, coupling 82 including seal 100 coupled between spindle liner 78 and vacuum liner 80 allows the liners 78, 80 to rotate with respect to each other while providing adequate vacuum draw on workpieces 14. Moreover, coupling 82 allows the liners 78, 80 to rotate without generating of excessive heat, causing excessive wear, etc.

Figure 5A:
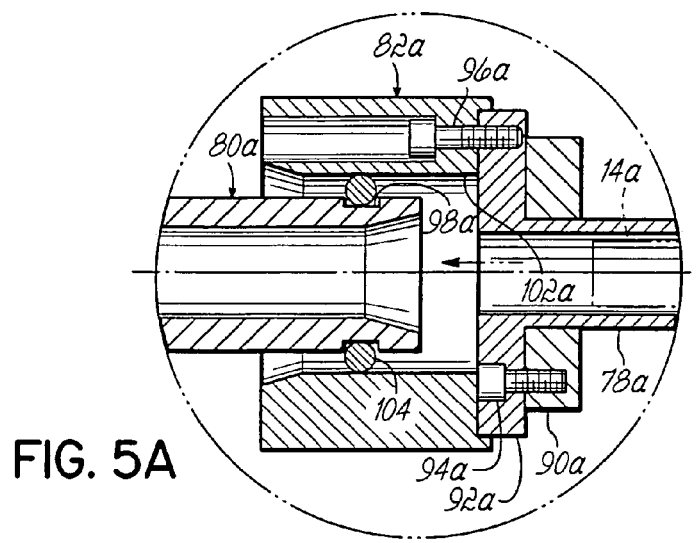
FIG. 5A is a detailed view of an alternative embodiment including an O-ring.

An alternative embodiment of the present invention is illustrated in FIG. 5A. For the sake of simplicity, like numerals will used to described like parts but with a letter "a" designation. In this embodiment, an O-ring 104 is used in place of a seal 100 and, likewise, allows liners 78a, 80a to rotate with respect to each other while providing adequate vacuum draw on workpieces 14a.

Figure 5B:
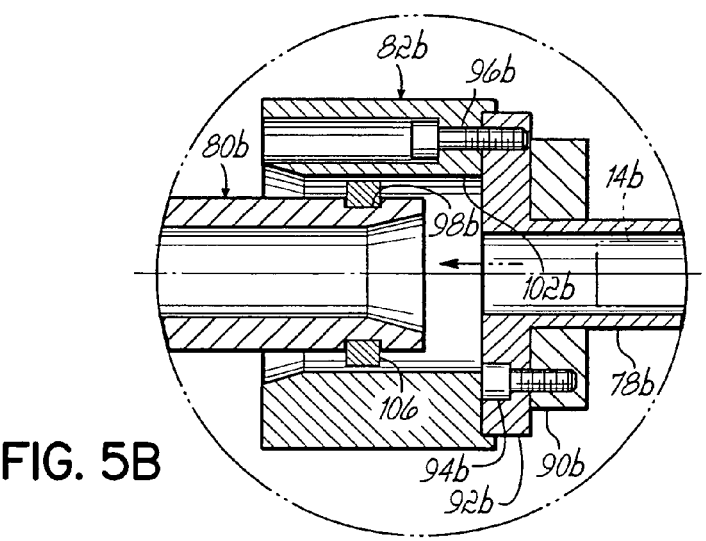
FIG. 5B is a detailed view of another alternative embodiment including a bearing material.

Referring now to FIG. 5B, another alternative embodiment is illustrated. Again, for the sake of simplicity, like numerals will used to described like parts but with the letter "b" designation. In this embodiment, a bearing material 106 is used in place of a seal 100 and an O-ring 104 and, likewise, allows liners 78b, 80b to rotate with respect to each other while providing adequate vacuum draw on workpieces 14b.

Figure 5C:
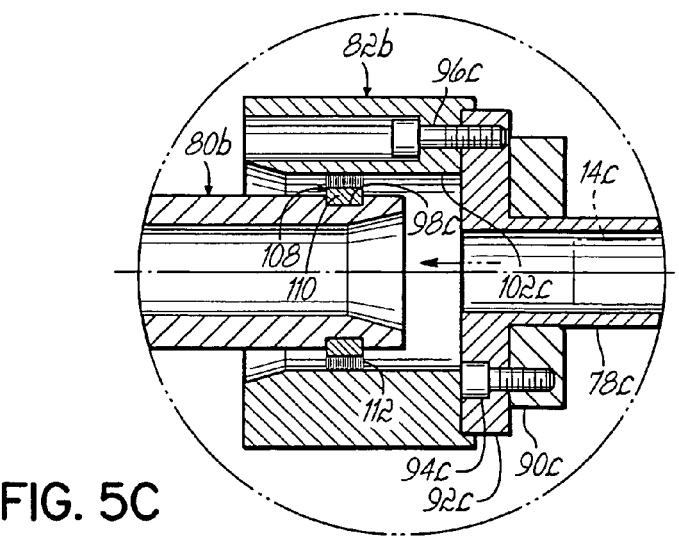
FIG. 5C is a detailed view of yet another alternative embodiment including a brush arrangement.

Referring now to FIG. 5C, yet another alternative embodiment is illustrated. Again, for the sake of simplicity, like numerals will used to described like parts but with the letter "c" designation. In this embodiment, a brush assembly 108 is used in place of a seal 100, an O-ring 104, and bearing material 106. Brush assembly 108 comprises a base 110 which holds bristles 112. Brush assembly 108 limits air flow between liners 78c, 80c, and allows for rotary and linear motion of the liners 78c, 80c. Brush assembly 108 also provides adequate vacuum draw on workpieces 14c.

Irrespective of whether a coupling 82, 82a-c uses a seal 100, an O-ring 104, or a brush assembly 108, the unloading procedure is similar. Referring once more specifically to FIG. 4, upon completion of a machining operation, vacuum chamber 16 is negatively pressurized or placed under vacuum. This draws workpiece 14 back into chamber 16, the workpiece impacting impact absorber 86 and coming to rest proximate opening 32 in sidewall aperture 34 of dump tube 18. At this point, and as also shown in FIG. 3, door 42 may be opened using actuator 52 to expose workpiece outlet 40 and allow workpiece 14 to drop into a tray 64. Actuator 52 may then be deactivated, allowing door 42 to close, readying unloading device 10 for receipt of the next workpiece 14.

It will be understood that a workpiece sensing device may be incorporated into end cap 84 and/or impact absorber 86. Such a sensing device may be constructed according to the teachings of the above incorporated '584 and '523 patents.

While the present invention has been illustrated by a description of a preferred embodiment and while this embodiment has been described in some detail, it is not the intention of the Applicants to restrict or in any way limit the scope of the appended claims to such detail. Additional advantages and modifications other than those specifically mentioned herein will readily appear to those skilled in the art. This has been a description of the present invention, along with the preferred methods of practicing the present invention as currently known. However, the invention itself should only be defined by the appended claims, wherein

I claim:

1. A device for unloading a workpiece from a machine tool, comprising:
    a non-rotating dump tube having one end adapted for communication with a machine tool and a sidewall defining an opening for discharging a workpiece;
    a vacuum chamber enclosing the opening in the sidewall and including a workpiece outlet, the chamber configured to receive a workpiece from the dump tube;
    a door selectively sealingly engaged with the workpiece outlet, and configured to allow the unloading of a workpiece; and
    a source of vacuum coupled to the vacuum chamber and configured to draw a workpiece through the dump tube and into the vacuum chamber for unloading.

2. The device of claim 1, further comprising an actuator operatively engaged with the door and operable to move the door to unload a workpiece.

3. The device of claim 1, further comprising an impact absorber located adjacent a distal end of the dump tube and configured to absorb the impact of a workpiece drawn into the tube from a machine tool.

4. The device of claim 3, wherein the impact absorber is further configured to locate a workpiece proximate the opening in the sidewall of the dump tube.

5. The device of claim 1, wherein the source of pressurized air is a pump connected for communication with the vacuum chamber.

6. The device of claim 1, further comprising a vacuum liner insertable into the dump tube and configured to improve the draw on a workpiece.

7. The device of claim 1, further comprising a coupling coupleable to a spindle liner and configured to allow the spindle liner to rotate with respect to the vacuum liner.

8. The device of claim 7, wherein the coupling includes a seal that allows for rotary and linear motion of the vacuum liner and the spindle liner.

9. The device of claim 7, wherein the coupling includes a bearing material that allows for rotary and linear motion of the vacuum liner and the spindle liner.

10. The device of claim 7, wherein the coupling includes an O-ring that allows for rotary and linear motion of the vacuum liner and the spindle liner.

11. The device of claim 7, wherein the coupling includes a brush assembly that allows for rotary and linear motion of the vacuum liner and the spindle liner.

12. An apparatus for unloading a workpiece from a machine tool, comprising:
    a vacuum unloading device including a vacuum liner;
    a coupling coupled for rotation with the machine tool and with resrect to the vacuum liner of the unloading device; and
    a contacting seal located between the machine tool and the coupling,
    the seal allowing the machine tool to continue to rotate at a rate greater than 100 revolutions per minute (RPM) while a workpiece is unloaded under vacuum through the vacuum liner.

13. The apparatus of claim 12, wherein the machine tool is capable of operating at 4,000 RPM.

14. The apparatus of claim 12, the machine tool having a spindle and including a spindle liner, the seal allowing the spindle liner to rotate with respect to the vacuum liner.

15. The apparatus of claim 14, the seal allowing for rotary and linear motion of the vacuum liner and the spindle liner.

16. The apparatus of claim 14, the seal comprising a bearing material that allows for rotary and linear motion of the vacuum liner and the spindle liner.

17. The apparatus of claim 14, the seal comprising an O-ring that allows for rotary and linear motion of the vacuum liner and the spindle liner.

18. A method of unloading a workpiece from a machine tool using a pneumatic unloading device, the method comprising:
    disposing a coupling intermediate the machine tool and the pneumatic unloading device; and
    applying a vacuum to the pneumatic unloading device to draw the workpiece from the machine tool while allowing the machine tool to rotate at a rate greater than 100 revolutions per minute (RPM).

19. The method of claim 18, wherein the machine tool is capable of operating at 4,000 RPM.

20. The method of claim 18, the pneumatic unloading device including a vacuum liner, the machine tool having a spindle and including a spindle liner, the coupling allowing the spindle liner to rotate with respect to the vacuum liner.

21. The method of claim 20, the coupling including a seal that allows for rotary and linear motion of the vacuum liner and the spindle liner.

22. The method of claim 20, the coupling including a bearing material that allows for rotary and linear motion of the vacuum liner and the spindle liner.

23. The method of claim 20, the coupling including an O-ring that allows for rotary and linear motion of the vacuum liner and the spindle liner.

24. An apparatus for unloading a workpiece from a machine tool, comprising:
    an unloading device including a vacuum liner;
    a coupling coupled between the machine tool and the unloading device, the machine tool including a spindle and a spindle liner, the coupling allowing the machine tool to continue to rotate at a rate greater than 100 revolutions per minute (RPM) while a workpiece is unloaded, the coupling allowing the spindle liner to rotate with respect to the vacuum liner and including a brush assembly that allows for rotary and linear motion of the vacuum liner and the spindle liner.

25. A method of unloading a workpiece from a machine tool using a pneumatic unloading device including a vacuum liner, the machine tool having a spindle and including a spindle liner method comprising:
    disposing a coupling intermediate the machine tool and the pneumatic unloading device, the coupling allowing the spindle liner to rotate with respect to the vacuum liner and including a brush assembly that allows for rotary and linear motion of the vacuum liner and the spindle liner;
    allowing the machine tool to continue to rotate at a rate greater than 100 revolutions per minute (RPM); and
    applying a vacuum to the pneumatic unloading device to draw the workpiece from the machine tool.

* * * * *